United States Patent [19]

Normile et al.

[11] Patent Number: 5,452,358

[45] Date of Patent: Sep. 19, 1995

[54] METHOD AND APPARATUS FOR IMPROVING THE SECURITY OF AN ELECTRONIC CODEBOOK ENCRYPTION SCHEME UTILIZING A DATA DEPENDENT ENCRYPTION FUNCTION

[75] Inventors: James O. Normile, Woodside; Ke-Chiang Chu, Saratoga, both of Calif.

[73] Assignee: Apple Computer, Inc., Cupertino, Calif.

[21] Appl. No.: 193,248

[22] Filed: Feb. 8, 1994

[51] Int. Cl.$^6$ .............................. H04L 9/00
[52] U.S. Cl. ........................ 380/42; 380/28; 380/49; 380/29; 380/46
[58] Field of Search .............. 380/4, 21, 28, 29, 42, 380/43, 44, 45, 46, 47

[56] References Cited

U.S. PATENT DOCUMENTS

| | | | |
|---|---|---|---|
| 4,233,577 | 3/1982 | Brandstrom | 380/29 |
| 4,890,324 | 12/1989 | Jansen | 380/43 |
| 5,351,299 | 9/1994 | Matsuzaki et al. | 380/42 |

OTHER PUBLICATIONS

Bidzos, D. James and Kaliski Jr., Burt S., "An Overview of Cryptography", Lan Times Feb., 1990.
Blahut, Richard E., "Digital Transmission of Information", Chapter 12.6, first para., Addison–Wesley Publishing Company, Jul. 9, 1993.
Blahut, Richard E., "Digital Transmission of Information", Chapter 12.7, Addison–Wesley Publishing Company, Jul. 9, 1993.
Sklar, Bernard, "Digital Communications: Fundamentals and Applications", Chapter 12.4 introduction, p. 694, Prentice Hall Publishers, 1988.
Kaliski, Burt, "Packet Encryption" RSA Laboratories, Slides 1,3,5,7,9,11,13,15,17, Jan. 22, 1992.

*Primary Examiner*—David C. Cain
*Attorney, Agent, or Firm*—Carr, DeFilippo & Ferrell

[57] ABSTRACT

An apparatus and method for improving the security of an electronic codebook encryption scheme comprises a transmitter unit for encoding or encrypting data and a separate authorized receiver for decoding or decrypting data. Both the transmitter and receiver share a common secret key that has been communicated through a separate channel.

The transmitter includes a Mapping Table (MTable) that comprises a table of functions, where a first series of incrementally numbered expressions are equated with a second series of randomly generated numbers. The plaintext is input into the transmitter and applied to the MTable to provide ciphertext. The PN generator supplies a unique random sequence of binary digits. The ciphertext byte and random number byte associated with each byte of plaintext data are exchanged to change the relationships within the MTable.

An Inverse Mapping Table (IMTable) is included in the receiver and is created by reversing the relationships between the sequential numbers and the mapping numbers in the MTable. From the encrypted communication, the ciphertext is separated and the respective functions for each ciphertext byte and random number byte are again exchanged, and the associated plaintext byte and random number byte are further exchanged to produce an MTable identical to that of the transmitter and unencrypted plaintext data identical to that originally encoded.

26 Claims, 8 Drawing Sheets

METHOD AND APPARATUS FOR IMPROVING THE SECURITY OF AN ELECTRONIC CODEBOOK ENCRYPTION SCHEME UTILIZING A DATA DEPENDENT ENCRYPTION FUNCTION

RELATED APPLICATIONS

This application is related to the subject matter of the following commonly assigned, applications which are incorporated by reference herein:

1) Ser. No. 08/110,402 entitled "Method and Apparatus for Variable Overhead Cached Encryption" filed Aug. 23, 1963, and 2) Ser. No. 08/184,978 entitled "Method and Apparatus for Improving the Security of an Electronic Codebook Encryption Scheme Utilizing an Offset in the Pseudorandom Sequence" filed Jan. 21, 1994.

BACKGROUND OF THE INVENTION

1. Field of the Invention

This invention relates to data encryption, and more particularly to an improved method and apparatus for data dependent encryption and decryption of data signals using a pseudorandom encoding sequence to provide increased security for transmitting data over public channels.

2. Description of the Background Art

Data encryption is a function that ensures the privacy of a digital communication by preventing an unauthorized receiver from understanding the contents of a transmitted message. A conventional "symmetric key" cryptosystem is generally illustrated in FIG. 1(a). An encoder transforms a plaintext data message into ciphertext using an invertable encryption transformation. This transformation is a function of the plaintext data input message and a secret key which is shared by both the encoder and the decoder. The ciphertext is then transmitted over an unsecured public channel and the intended receiver of the message, also in possession of the secret key, applies the inverse transformation to decrypt the ciphertext and recover the original plaintext data message. The secret key is communicated to an authorized user through a secure channel (for example, a secure Key Exchange Algorithm) or a public channel (such as a Public Key Distribution System) and the key effectively dictates a specific encryption transformation from a family of cryptographic transformations. In general, any station in possession of the secret key may encrypt or decrypt messages.

A conventional cryptosystem can be said to exhibit "unconditional security" if the secret key is as long as the ciphertext message, each key is used only once, and all keys are equally likely. However, since most systems can be expected to transmit a large number of messages, the problem of distributing the key information becomes formidable. Most practical cryptosystems have short keys compared to the length of a message. The lessened security resulting from short keys is compensated for by relying on the complexity of the way that the key is combined with the data.

A particular example of a conventional cryptosystem, hereafter referred to as an electronic codebook, is generally illustrated in FIG. 1(b). The electronic codebook involves the use of a secret key that is shared by both the transmitter and the receiver. The transmitter utilizes the key to generate a deterministic, apparently random sequence of binary digits or numbers using a Pseudorandom Number (PN) generator. An essential feature of the PN generator is that with a specific key input, a unique PN sequence of arbitrary length may be generated. The PN sequence is then combined with the binary representation of the plaintext data message to be encrypted to produce a sequence of ciphertext. The combination of the PN sequence and the plaintext data must be accomplished using an invertable function. An invertable function is one that has a known inverse such that when the inverse function is applied to the ciphertext the original plaintext data can be extracted. For example, two's complement addition or bitwise exclusive-OR (XOR) are two widely used invertable functions, although other functions can be employed.

Decoding of the encrypted ciphertext may be performed by the receiver using a method identical to that used by the transmitter. Ciphertext is received from the transmitter and combined using a logical XOR gate, with a pseudorandom sequence generated by a PN generator identical to that used in the transmitter. The essence of the electronic codebook system is that an encryption key is used to generate a pseudorandom sequence in the transmitter side, and the identical sequence is then generated in the receiver when the same encryption key is applied to the receiver PN generator. The XOR gate in the receiver provides the inverse function of the XOR gate in the transmitter so that logical combination of the ciphertext and the PN sequence in the receiver produces the same plaintext data that was originally encoded by the transmitter.

The conventional cryptosystem poses a number of problems, including inefficiencies associated with using the key only once, and the accompanying challenge of distributing new keys over clear channels. A system for variable-overhead cached encryption addresses the high overhead that results from generating PN sequences that are used only once to maximize security for transmitting data over public use lines. The system provides a means for storing and reusing PN sequences in order to increase the transmission rate of messages through a cryptosystem.

What is needed is a codebook encryption scheme that is data dependent, where repeatedly reused random number sequences are intermixed with plaintext data in accordance with a method that removes the correlation between random number sequences, in order to provide a variable relationship between the plaintext data and encryption function.

SUMMARY OF THE INVENTION

In accordance with the present invention, an apparatus and method are described for improving the security of an electronic codebook encryption scheme. A transmitter unit is used for encoding or encrypting data and a separate authorized receiver decodes or decrypts the data. Both the transmitter and receiver share a common secret key that has been communicated through a separate channel. The transmitter utilizes the secret key (which serves as a constant base value) as an input for a Pseudorandom Number (PN) generator which responds by initiating a Mapping Table and by generating a random sequence of binary digits.

The transmitter includes a Mapping Table (MTable) that comprises a table of functions, where a first series of incrementally numbered expressions are equated with a second series of randomly generated numbers. The plaintext is input into the transmitter and applied to the MTable to provide ciphertext. The PN generator supplies a unique random sequence of binary digits. The ciphertext byte and random number byte associated with each byte of plaintext data are exchanged, or swapped, to change the relationships within the MTable. Utilizing the plaintext data in the encoding scheme allows the encryption function to be data dependent and removes the correlation between messages using repeated random sequences for encryption, as this type of repetitive use subjects encoded communications to cryptoanalytic attack.

As the transmitter MTable is initialized using the secret key and PN generator of the transmitter, a second MTable and an Inverse Mapping Table (IMTable) included in the receiver are likewise initialized using the secret key and PN generator of the receiver. The IMTable is created by reversing the relationships between the sequential numbers and the mapping numbers in the MTable. The encrypted communication is imported by the receiver and applied directly to the IMTable. The receiver's PN generator utilizes the secret key to produce the same random sequence for decryption as that produced by the transmitter's PN generator for encryption. From the encrypted communication, the ciphertext is separated and decoded in the IMT. The respective functions for each decoded byte and random number byte are swapped in the receiver's MTable to produce unencrypted plaintext data identical to that originally encoded.

DESCRIPTION OF THE PREFERRED EMBODIMENT

Figure 1A:
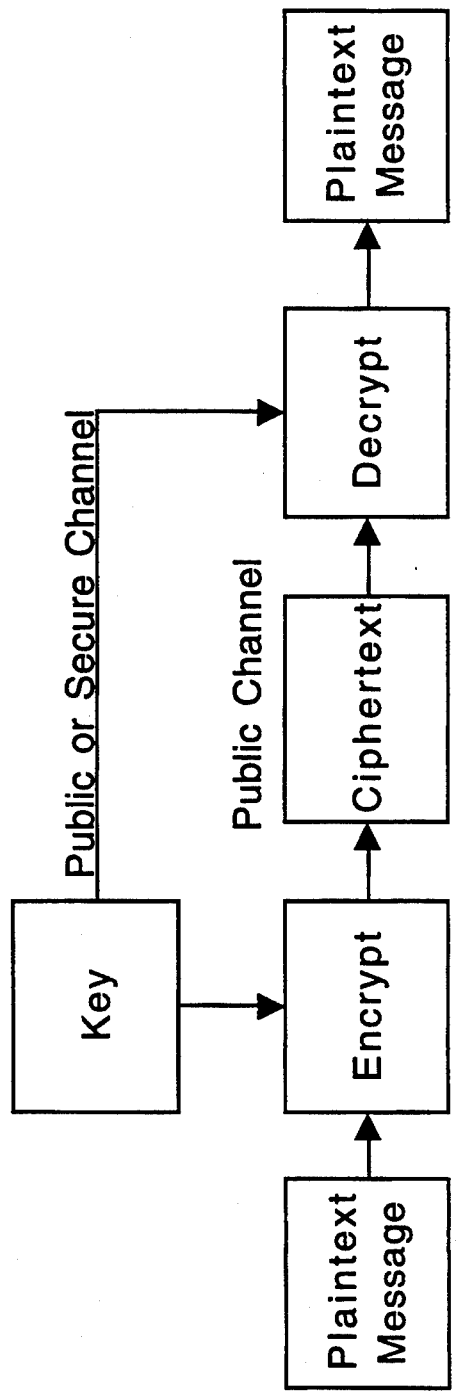
FIG. 1(a) is a block diagram showing a conventional symmetric key cryptosystem.
Figure 1B:
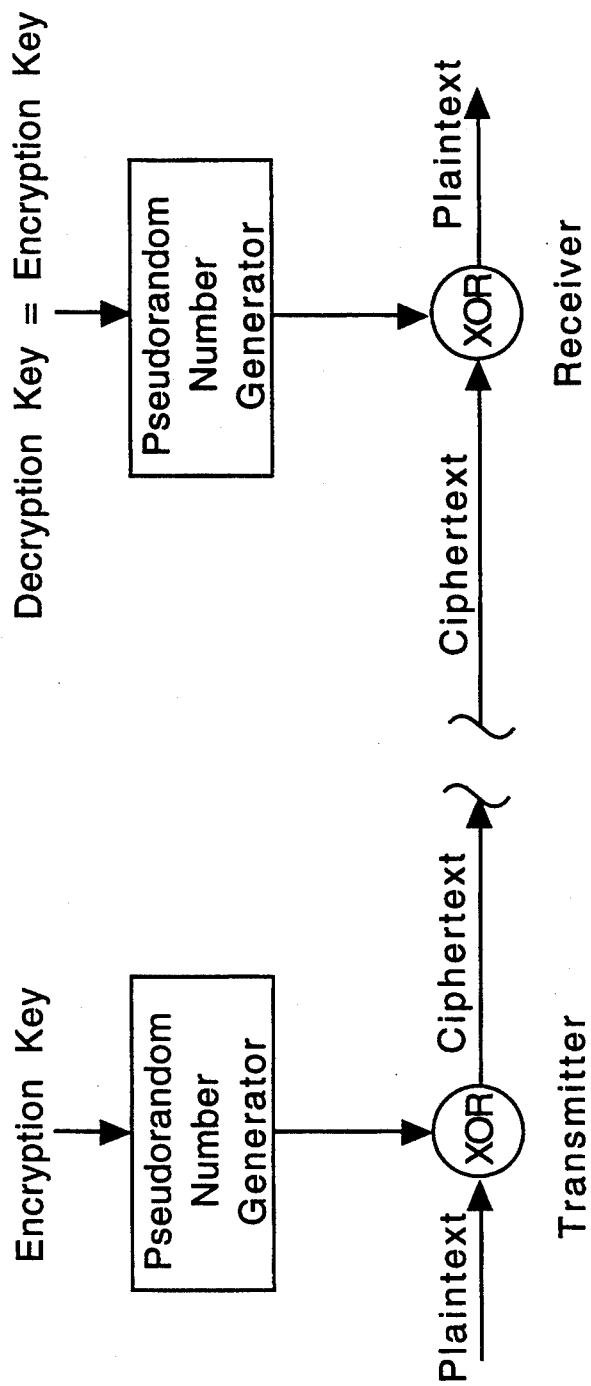
FIG. 1(b) is a block diagram showing an example electronic codebook cryptosystem of the prior art.
Figure 2A:
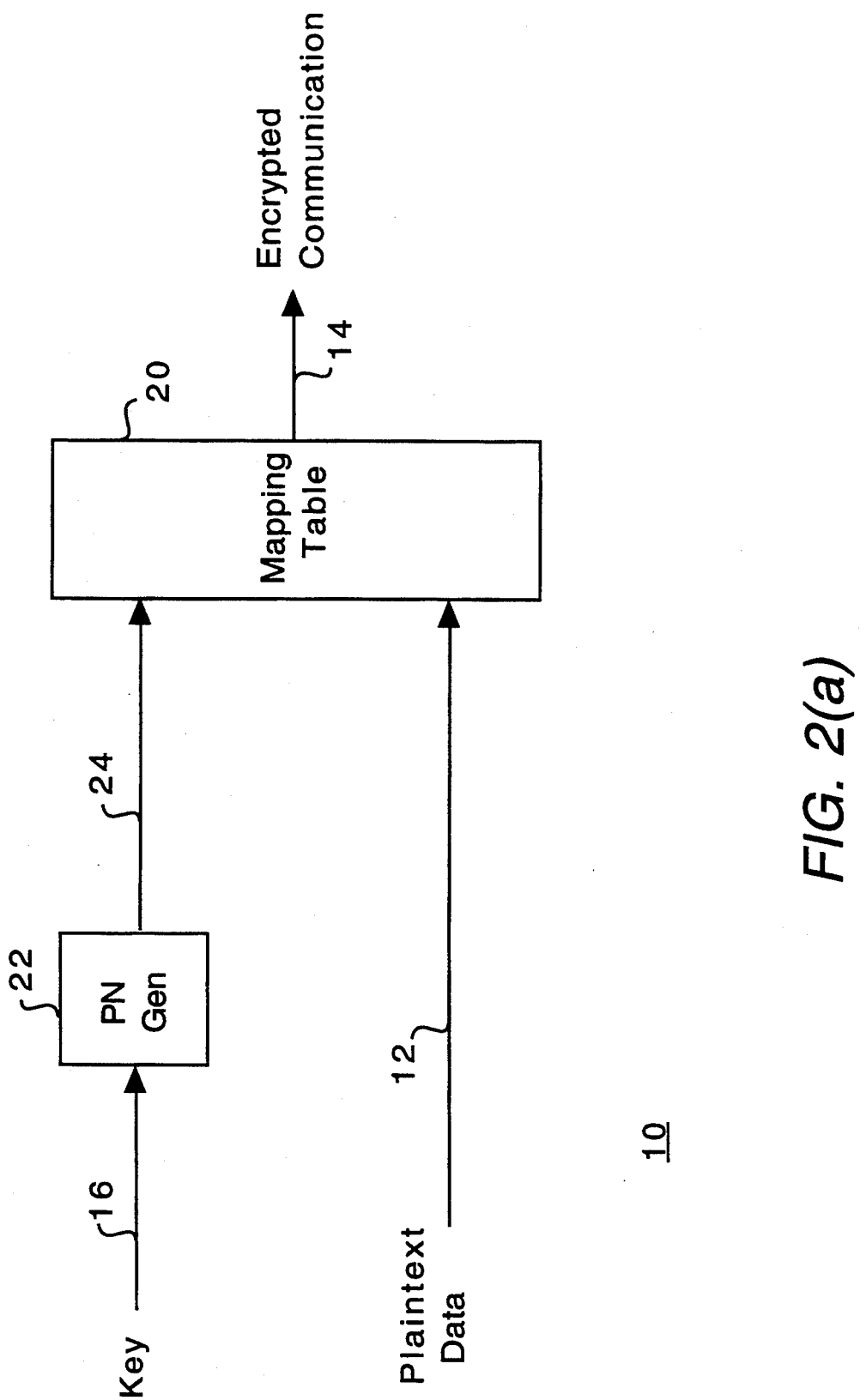
FIG. 2(a) is a block diagram showing the preferred transmitter of the data dependent encryption system of the present invention.

Referring now to FIG. 2(a), a transmitter 10 is shown for encrypting plaintext data 12 to produce encrypted communication 14. Plaintext data 12 is digital information which may be readily understood by both a sender and a receiver and may also be readily understood by other unauthorized third parties having access to the communications channel. The function of the transmitter 10 is to encode or encrypt the plaintext data 12 in such a way that the information is usable only to a receiver having bona fide access to the data. A central feature of the transmitter 10 is a secret key 16 which is secret as to third parties but shared between the transmitter 10 and a receiver 18 (discussed below with reference to FIG. 3) of the plaintext data 12. As discussed with reference to FIG. 1(a), the secret key 16 would ideally be infinite in length and would be unique as to every message communicated between the transmitter 10 and the receiver 18. In practice, however, the secret key 16 is relayed only periodically between the transmitter 10 and the receiver 18 and during the periods between the relay of the secret key 16, the secret key 16 is used repetitively to encrypt plaintext data 12 from the transmitter 10 before transmission to the receiver 18.

The secret key 16 is used as a seed for a Pseudorandom Number (PN) generator 22. In response to the secret key 16, the PN generator 22 produces a unique sequence of random numbers (PN sequence) 24, which is output directly to a Mapping Table (MTable) 20. The MTable 20 combines the PN sequence 24 with the plaintext data 12 to produce an encrypted communication 14, which may be securely transmitted to a receiver at a remote location. The structure of the MTable 20 is such that the plaintext data 12 can be recovered using a second MTable which implements an inverse function of the first table.

Figure 2B:
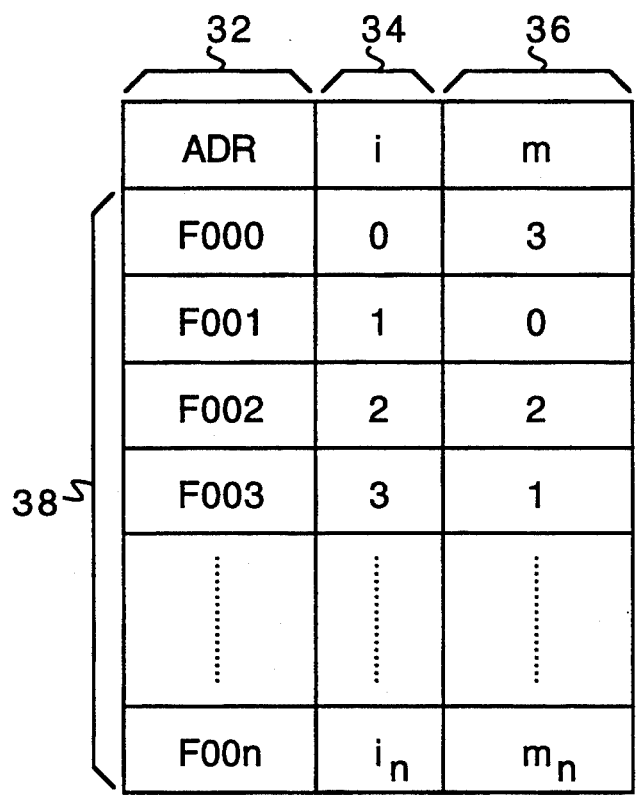
FIG. 2(b) is a memory map of a storage memory used for implementing the Mapping Table of FIG. 2(a)

Referring now to FIG. 2(b), a memory map is shown of a digital storage memory used for implementing the MTable 20. The MTable 20 is preferably allocated using a series of rows 38, each row being identified by a memory address 32. For illustrative purposes, the rows 38 of MTable 20 have been assigned memory addresses F000 to F00n. Each address has a sequence number 34, (i), which corresponds to a value in the plaintext data sequence 12, and a corresponding mapping number 36, (m), which maps each value of the plaintext data sequence 12 to an alternate value. In the example MTable 20 of FIG. 2(b), the address location F000 maps value 0 of the plaintext data sequence 12 to value 3. Address F001 maps value 1 of the plaintext data sequence 12 to value 0, and so on. This remapping of the plaintext data sequence 12 is integral to the encrypting of the plaintext data 12. Values for the mapping numbers 36, (m), are initially generated and updated using the PN sequences 24 produced by the PN generator 22, in conjunction with the secret key 16. The method steps associated with generating and utilizing the MTable 20 are more fully discussed below with reference to FIG. 5.

In an alternative embodiment of the present invention, the transmitter and receiver further include caches. The efficiency of encryption by the transmitter 10 and decryption by the receiver 18 may be enhanced by concurrently utilizing a caching system. The caching system is the subject of U.S. patent application Ser. No. 08/110,402 filed Aug. 23, 1993, and is completely described therein; therefore, it will not be fully reiterated here. Briefly, in order to improve the efficiency of encoding and decoding, the PN sequence 24 is stored in a cache, or memory, and is repeatedly reused. A first PN sequence 24 stored in the transmitter's cache and then output to the mapping table 20. The same cached PN sequence 24 will be repeatedly used to encrypt the plaintext data 12. The first block of encrypted communication 14 received by the receiver 18 signals the receiver's PN generator 23 to produce the PN sequence 25 needed to decode the encrypted communication 14. The PN sequence 25 generated is stored in a second cache. When the next block of encrypted communication 14 is received, the PN sequence 25 need not be regenerated by PN generator 23, but rather may be read from the receiver's cache as a stored sequence. Commonly, repeated use of the PN sequence 24 is avoided as the repeated PN sequence is susceptible to cryptoanalytic attack. However, in this alternative embodiment, the use of a mapping table 20 causes the encryption function to be data dependent, and therefore knowledge of the repeated PN sequence 24 is of no significance.

Figure 3:
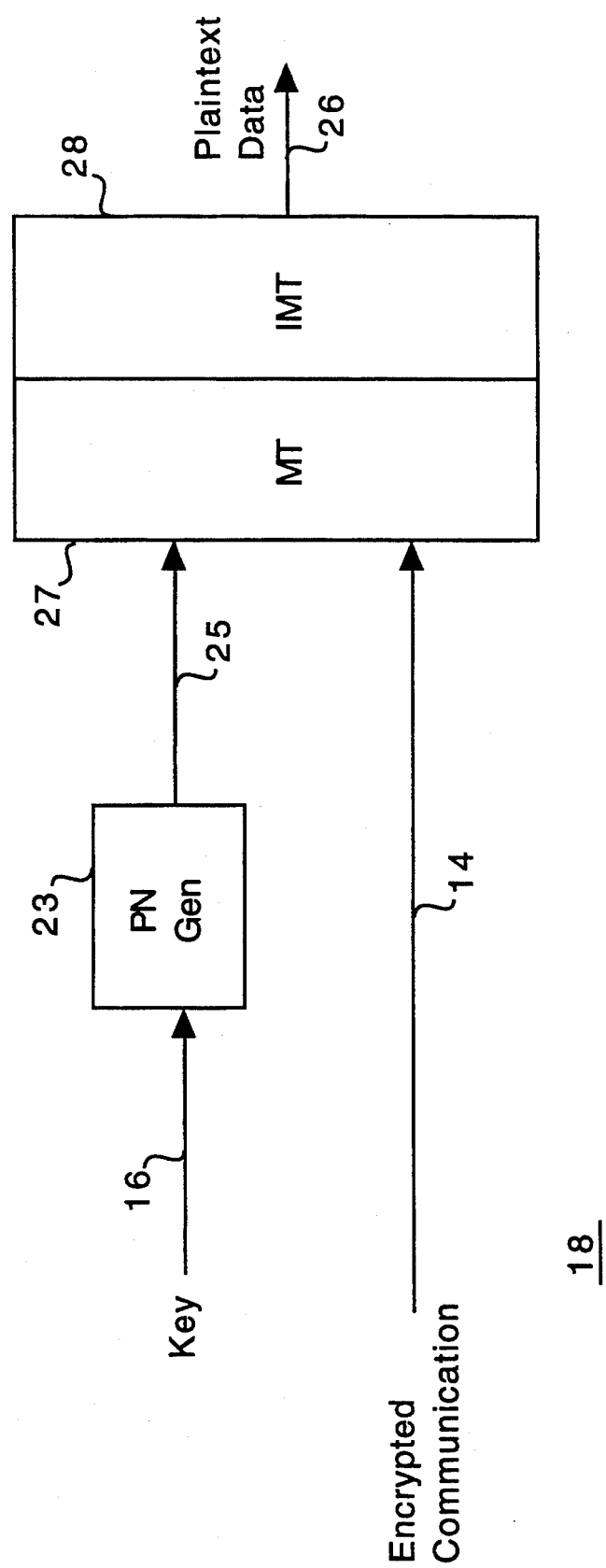
FIG. 3 is a block diagram showing the preferred receiver of the data dependent encryption system of the present invention.

Referring now to FIG. 3, a receiver 18 is shown in which the encrypted communication 14 from the transmitter 10 is decoded to produce decrypted plaintext data 26, which is identical to the plaintext data 12 originally encoded in the transmitter 10. The receiver's PN generator initializes a Mapping Table (MTable) 27 identical to the transmitter's MTable 20 and an Inverse Mapping Table (IMTable) 28. The IMTable is constructed by reversing the relationships between the sequence numbers 34 (FIG. 2(b)) and the mapping numbers 36 in the MTable 20.

With respect to the previous example of FIG. 2(b) having the simple mapping expressed as MTable[i]=m:

MTable [0] = 3
MTable [1] = 0
MTable [2] = 2
MTable [3] = 1

The IMTable 28 is generated by first sequentially loading the PN sequence 25 into each sequence number 34 and re-sorting the IMTable 28 to provide the incrementally numbered expressions:

IMTable [0] = 1
IMTable [1] = 3
IMTable [2] = 2
IMTable [3] = 0

This IMTable 28 is utilized by the receiver 18 to decode the encrypted communication 14. As the encrypted communication 14 is imported by the receiver 18, it is directly applied to the IMTable 28.

The secret key 16 acts as a seed for the receiver's 18 PN generator 23 which provides a PN sequence 25 identical to that provided by the PN generator 22 of the transmitter 10. The PN sequence 25 is combined with the encrypted communication 14 to unscramble the plaintext data 12.

An important benefit of the encryption system of the present invention is that, with the exception of the secret key 16, all the information needed to decode a block of transmitted data is contained within the message. Knowledge of prior messages or sequences is not required.

Figure 4:
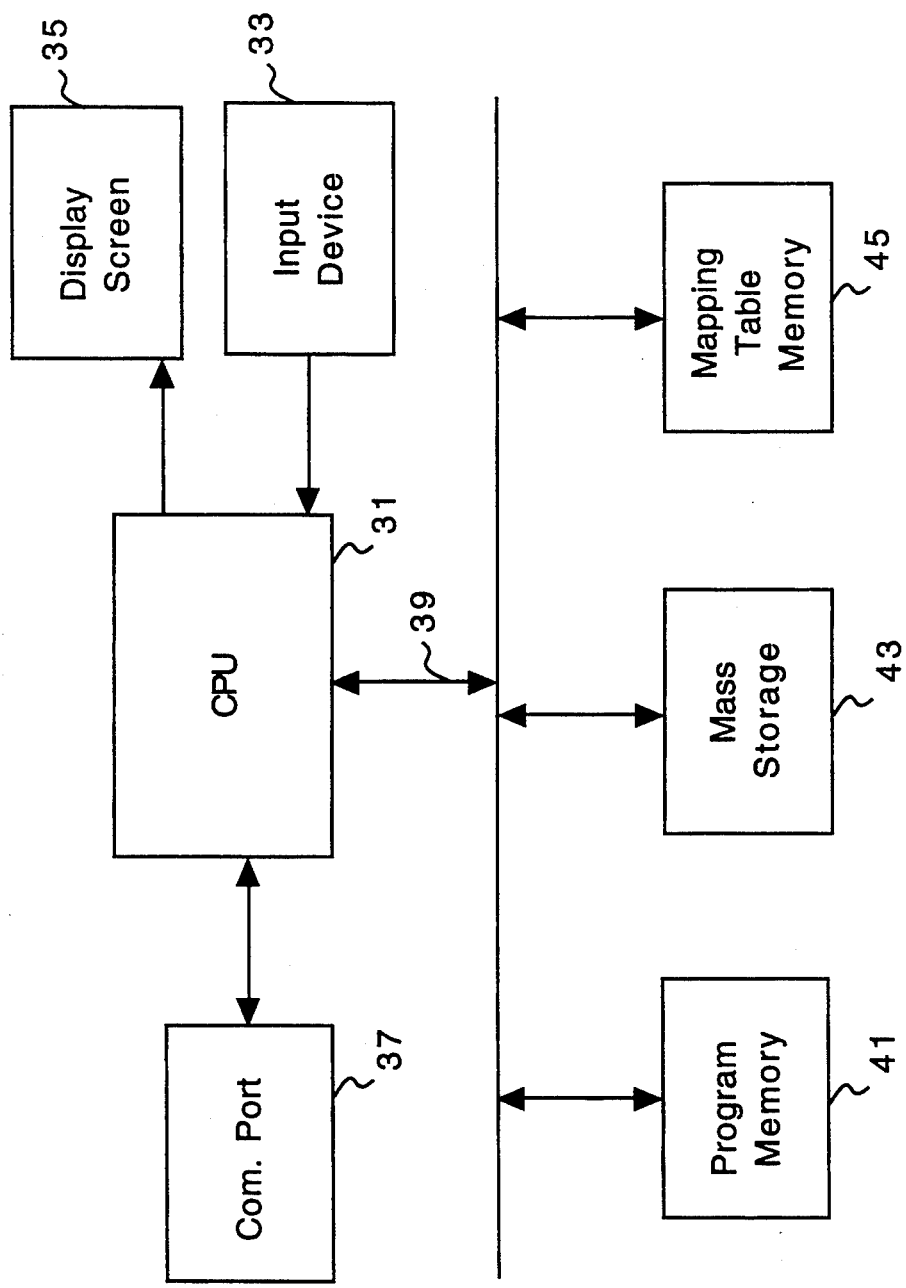
FIG. 4 is a block diagram showing a general purpose computer which is used to implement the data dependent encryption system of the present invention.

Referring now to FIG. 4, a block diagram is shown of a general purpose computer 30 used in the preferred implementation of the encryption system shown in FIGS. 2(a) and 3. The preferred implementation of the present invention consists of programmed instructions implemented on an Apple Macintosh® computer, manufactured by Apple Computer, Inc. of Cupertino, Calif. The general method steps, described below, can be equivalently implemented on any general purpose computer and many other programmable processor-based systems. The general purpose computer 30 consists of a CPU 31 attached to a number of processing components. The CPU 31 contains an input device 33 and a display screen 35 through which a user can interact with the CPU 31. The CPU 31 is connected to a communication port 37 for interfacing with other processors and communication devices, such as modems and area networks. The CPU 31 further comprises a databus 39 for connecting various memories, including a program memory 41, mass storage 43, and mapping table memory 45. The program memory 41 contains operating instructions for directing the control of the CPU 31. The mass storage 43 contains stored data that is utilized by the CPU 31 in executing the instructions from the program memory 41. The mapping table memory 45 stores the set-up of the MTable after it is initialized by the secret key 16.

Referring also to FIGS. 2(a) and 3, the PN generators 22 and 23 are implemented by the CPU 31 using a conventional pseudorandom number generator algorithm. The computer system 30 can implement the encryption system in a number of ways. A first computer system can act as a transmitter 10 and export encrypted communications 14 to a second computer system via the communication port 37. In this operating mode, the first computer acts as the transmitter 10 while the second computer acts as the receiver 18. This first mode of operation provides for secure communication of sensitive data.

In an alternative operating mode, a single computer system 30 acts as both the transmitter 10 and as the receiver 18, storing encrypted communication 14 to mass storage 43 and later retrieving the stored communication 14 for decoding and use. The purpose of this second mode of operation is to allow for the secure storage of sensitive data.

Figure 5:
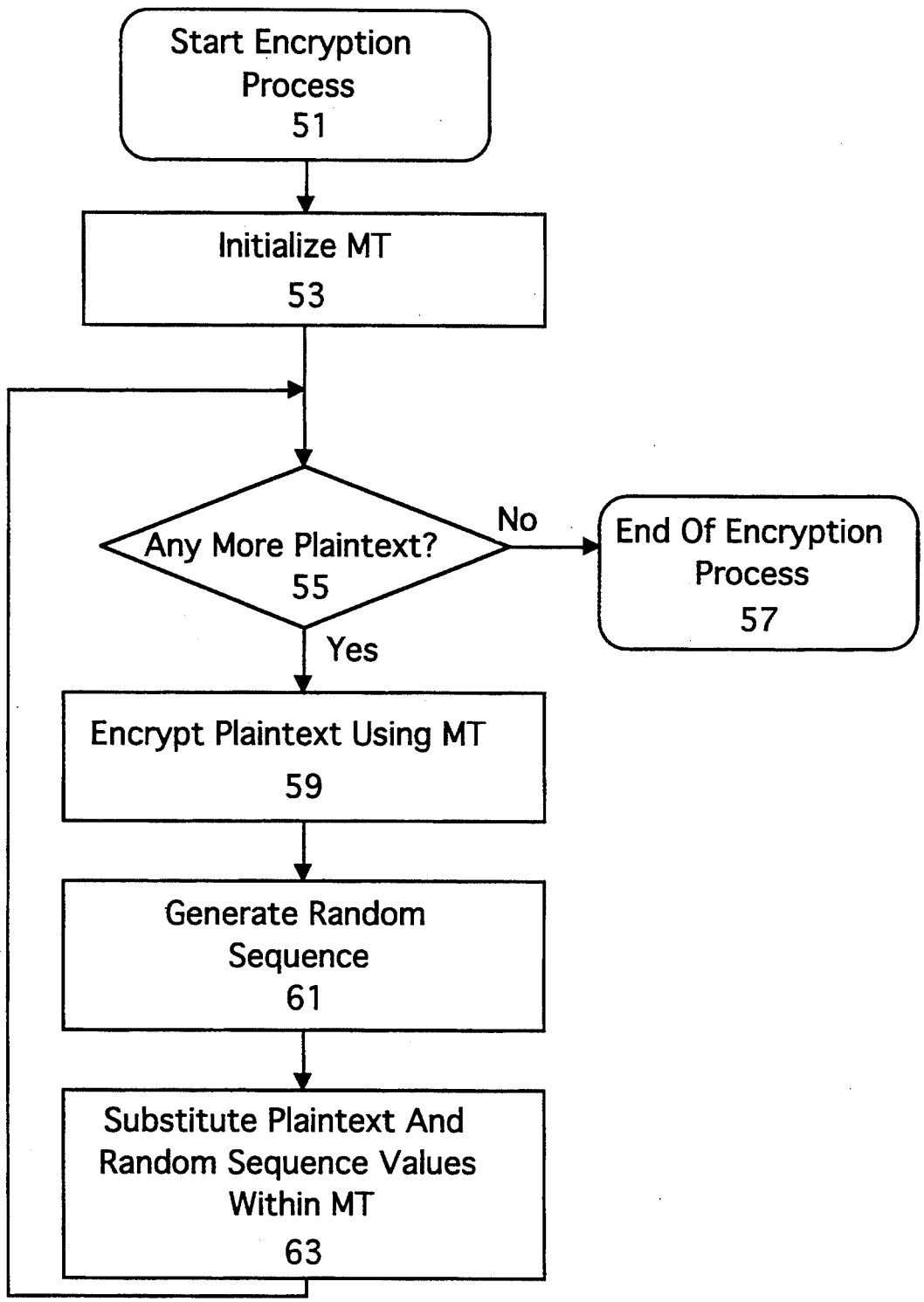
FIG. 5 is a flow diagram showing the method steps of transmitting encrypted data using the apparatus of FIG. 2(a)

Referring now to FIG. 5, a flow chart is shown outlining the programmed instruction steps which are executed by the general purpose computer 30 (FIG. 4), acting in the mode of a transmitter 10 (FIG. 2) in encrypting plaintext data 12 to produce the encrypted communication 14 of the present invention. Step 51 is the starting point for the encrypting instructions of FIG. 5. At the outset, the MTable 20 is initialized 53 using the PN generator 22 and the secret key 16. The programmed instructions prompt the CPU 31 to determine 55 whether more plaintext data 12 will be imported into the transmitter 10. If no further plaintext data 12 is delivered for encryption, the encryption cycle is complete 57. If further plaintext data 12 is available, the CPU 31 encrypts 59 each byte of plaintext data 12 using the MTable 20 to produce ciphertext 15. The sequence number, (i), 34 (FIG. 2(b)) of the plaintext data 12 is mapped to an alternate value by the function:

$$\text{Ciphertext}(i) = \text{MTable}[\text{Plaintext}(i)]$$

A random number sequence 24 is generated 61 by the PN generator 22, and the mapping number 36 (FIG. 2(b)) associated with each ciphertext byte and the mapping number 36 associated with each random number byte are exchanged 63 in accordance with the following function:

Swap: MTable[Plaintext(i)] and
MTable[RandomSeq(i)]

Upon completion of the reorder 63, the CPU 31 reverts to step 55 of the programmed instructions. Each byte of plaintext data 12 is encoded in accordance with these functions until the CPU 31 determines 55 that no more plaintext data 12 is available, and thus the end 57 of the encryption process is reached. The encrypted communication 14 is preferably transmitted to the receiver 18 as soon as it is encrypted, however, in the alternative, the encrypted communication 14 can be stored in a memory until all of the available plaintext data 12 has been encrypted, and then sent as a complete group of encrypted communication 14 to the intended receiver 18.

To exemplify the encoding of a byte of plaintext data 12, assume the following initial MTable:

| | |
|---|---|
| MTable [0] | = 3 |
| MTable [1] | = 0 |
| MTable [2] | = 2 |
| MTable [3] | = 1 |

Further, assume that the plaintext data byte to be encrypted is "1" and that the random number generated for this encryption is "3". In accordance with the function:
Plaintext = 1
Random number = 3
Ciphertext(i) = MTable[Plaintext(i)]
the MTable 20 maps value 1 of the plaintext data sequence 12 to value 0. Thus, the ciphertext 15 is "0" as determined by the second row address of the initial MTable.

| | | |
|---|---|---|
| | MTable [0] | = 3 |
| << << | MTable [1] | = 0 |
| | MTable [2] | = 2 |
| | MTable [3] | = 1 |

Next, the encoding function:
Swap MTable[Plaintext(i)] and MTable[RandomSeq(i)] exchanges MTable[1] and MTable[3]

| | | |
|---|---|---|
| | MTable [0] | = 3 |
| << << | MTable [1] | = 0 |
| | MTable [2] | = 2 |
| << << | MTable [3] | = 1 | and produces the following MTable:

| | |
|---|---|
| MTable [0] | = 3 |
| MTable [1] | = 1 |
| MTable [2] | = 2 |
| MTable [3] | = 0 | and the resulting ciphertext 15 is sent to the receiver 18 as the encrypted communication 14.

Although a scheme of substituting values is described as a means for encrypting the plaintext data 12, it is also anticipated that scrambling of the plaintext data 12 works equivalently well. In an alternative embodiment, the position of the sequence number 34, (i), in the plaintext data 12 sequence is swapped, or reordered, with the corresponding mapping number 36, (m). The result of the swap is that the position of the plaintext data 12 sequence is mapped to an alternate position, thus scrambling the plaintext data 12.

Figure 6:
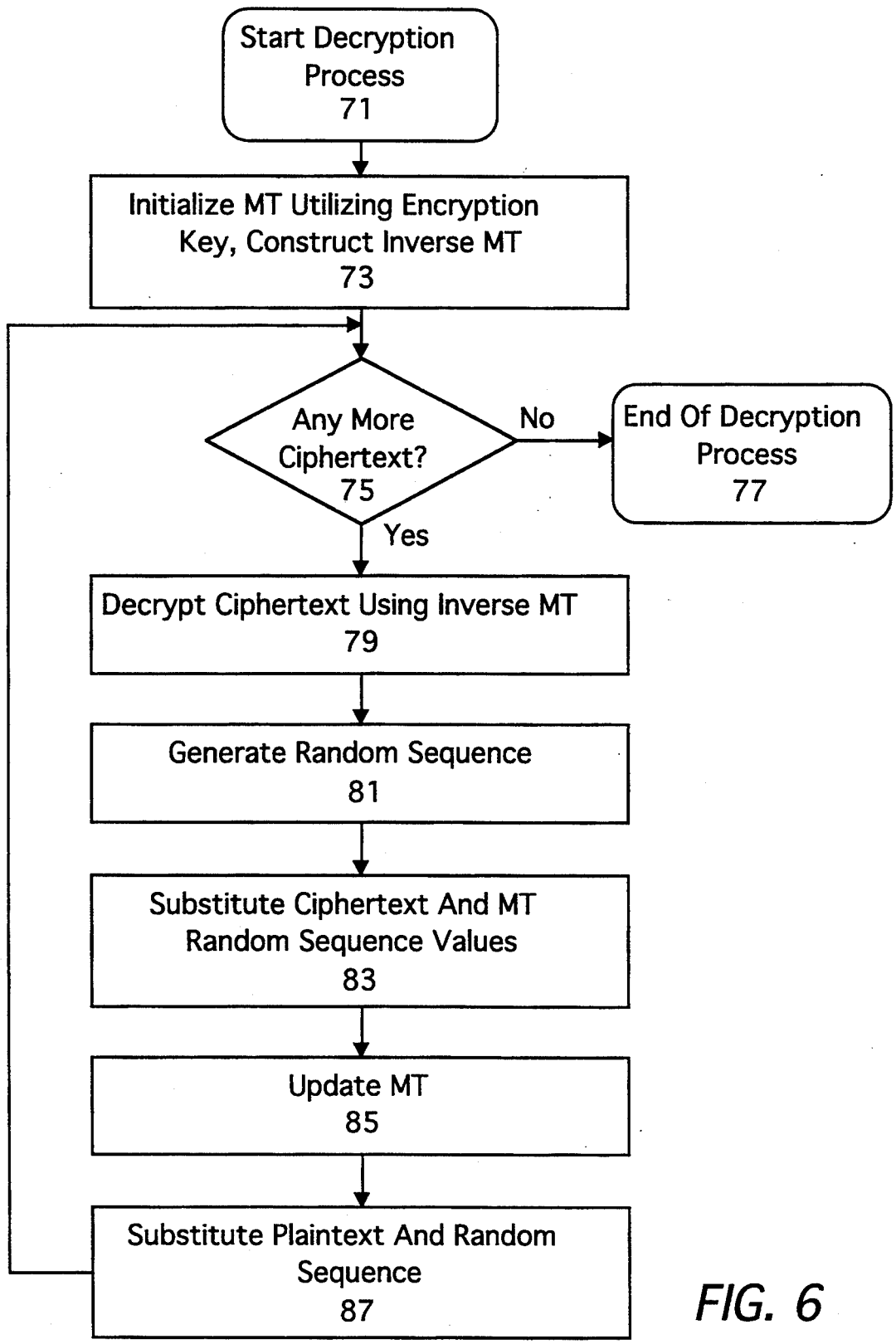
FIG. 6 is a flow diagram showing the method steps of receiving encrypted data using the apparatus of FIG. 3.

Referring now to FIG. 6, with the computer 30 acting in the mode of a receiver 18 (FIG. 3), the decryption cycle starts 71 when the receiver 18 imports the encrypted communication 14. First, the receiver's PN generator 23 initializes 73 an MTable 27 and an Inverse Mapping Table 28. Next, the CPU 31 determines 75 if there is more encrypted communication 14 forthcoming from the transmitter 10. If not, the decryption cycle is complete 77. However, where more encrypted communication 14 is being received, the CPU 31 separates the PN sequence 25 from the encrypted communication 14 and decrypts 79 each byte of plaintext data 12 using the IMTable 28 to produce ciphertext 15. In decryption, the sequence number 34, (i), of the ciphertext 15 is mapped to an alternate value by the function:

Plaintext(i) = IMTable[Ciphertext(i)]

A PN sequence 25 is generated 81 by the receiver's PN generator 23. The mapping number 36 associated with each plaintext byte, and the mapping number 36 associated with each random number byte are then exchanged 83 in accordance with the following function:

Swap: IMTable[Ciphertext(i)] and
IMTable[MTable[RandomSeq(i)]]

Following step 83, the receiver's MTable 27 is updated 85 in accordance with the changes to the IMTable 28. Next, the mapping number 36 associated with each plaintext byte and the mapping number 36 associated with each random number byte are again exchanged 87, in accordance with the function:

Swap: MTable[Plaintext(i)] with
MTable[RandomSeq(i)]]

Upon completion of the reorder 87, the CPU 31 reverts to step 75 of the programmed instructions. Each byte of encrypted communication 14 is decrypted 79 in accordance with this method until the CPU 31 determines 75 that no more encrypted communication 14 is available, and thus the end 77 of the decryption process is reached and all of the plaintext data 12 has been decrypted.

To exemplify the decoding of a byte of encrypted communication 14, the IMTable 28 is constructed in the receiver in accordance with step 73. The IMTable 28 is:

| | |
|---|---|
| IMTable [0] | = 1 |
| IMTable [1] | = 3 |
| IMTable [2] | = 2 |
| IMTable [3] | = 0 |

The ciphertext 15 is separated from the encrypted communication 14. In the encoding example, the ciphertext 15 was determined to be "0" and the random sequence "3". In accordance with the function:
Ciphertext = 0
Random sequence = 3
Plaintext(i) = IMTable[Ciphertext(i)]
the MTable maps value 0 of the ciphertext 15 to value 1. Thus, the plaintext is "1" as determined by the first row address of the IMTable.

| | | |
|---|---|---|
| | IMTable [0] | = 1 |
| << << | IMTable [1] | = 3 |
| | IMTable [2] | = 2 |
| | IMTable [3] | = 0 |

Next, the IMTable 28 reordering function:

Swap IMTable[Ciphertext(i)] and
IMTable[MTable[RandomSeq(i)]]

exchanges IMTable[0] and IMTable[1],

|                |                    |
| -------------- | ------------------ |
| < < < <        | IMTable [0] = 1    |
| < < < <        | IMTable [1] = 3    |
|                | IMTable [2] = 2    |
|                | IMTable [3] = 0    | and produces the following IMTable 28:

|                    |
| ------------------ |
| IMTable [0] = 3    |
| IMTable [1] = 1    |
| IMTable [2] = 2    |
| IMTable [3] = 0    |

In accordance with step 85, the receiver's MTable 27 is updated in accordance with the decoded ciphertext. The updated MTable 27 is as follows:

|                  |
| ---------------- |
| MTable [0] = 3   |
| MTable [1] = 1   |
| MTable [2] = 2   |
| MTable [3 = 0    |

Next, the mapping number 36 associated with each plaintext byte and the mapping number 36 associated with each random number byte are again exchanged in accordance with:

Swap MTable[Plaintext(i)] with
MTable[RandomSeq(i)],
to produce:

|                  |
| ---------------- |
| MTable [0] = 3   |
| MTable [1] = 0   |
| MTable [2] = 2   |
| MTable [3] = 1   |

This mapping is identical to the initial MTable 20 used by the transmitter 10 to encrypt the plaintext data 12.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. An apparatus for the communication of encrypted data, the apparatus comprising a transmitter for encoding plaintext data, the transmitter comprising:
   a first Pseudorandom Number (PN) generator for generating and outputting a first Pseudorandom Number (PN) sequence; and
   a Mapping Table (MTable) comprising a plurality of storage positions, the MTable having inputs for receiving plaintext data and the first PN sequence and an output for communicating encrypted ciphertext, the ciphertext being produced by the data dependent mapping of plaintext data.

2. The apparatus according to claim 1 in which the transmitter MTable maps the plaintext data to produce ciphertext according to the function:

Ciphertext(i)=MTable[Plaintext(i)].

3. The apparatus according to claim 1 in which the transmitter MTable is initialized using a secret key and the numbers from the first PN sequence.

4. The apparatus according to claim 1 wherein the transmitter MTable substitutes values between the plaintext data and the first PN sequence to produce ciphertext.

5. The apparatus according to claim 1 wherein the transmitter MTable reorders data between storage positions following the mapping of plaintext data to produce ciphertext.

6. The apparatus according to claim 4 wherein the transmitter MTable substitutes values according to the function:

Swap: MTable[Plaintext(i)] and MTable[PN Seq(i)].

7. The apparatus according to claim 5 wherein the transmitter MTable reorders data according to the function:

Swap: MTable[Plaintext(i)] and MTable[PN Seq(i)].

8. The apparatus according to claim 1 further comprising a receiver for decoding the encoded plaintext produced by the transmitter, the receiver comprising:
   a second PN generator for generating and outputting a second PN sequence, wherein the first and second PN sequences are identical; and
   an Inverse Mapping Table (IMTable) comprising a plurality of storage positions, the IMTable having an output and having inputs for receiving the ciphertext data from the transmitter and the second PN sequence, the IMTable storing the inverse of the MTable contained in the transmitter for reversing the mapping of the ciphertext in order to produce the original plaintext data.

9. The apparatus according to claim 8 wherein the receiver further includes an MTable from which the IMTable is constructed, the MTable comprising a plurality of storage positions and having inputs for receiving the decoded ciphertext from the IMTable, the MTable reversing the mapping of the decoded ciphertext and the second PN sequence to produce the original plaintext data.

10. The apparatus according to claim 8 wherein the IMTable reverse maps the ciphertext to produce decoded plaintext data in accordance with the function:

Plaintext(i)=IMTable[Ciphertext(i)].

11. The apparatus according to claim 9 wherein the MTable is initialized using the second PN sequence.

12. The apparatus according to claim 11 wherein the IMTable reorders data according to the function:

Swap: IMTable[Ciphertext(i)] and
IMTable[MTable[PN Seq(i)]].

13. The apparatus according to claim 12 wherein following the reorder function of claim 9, the MTable further reorders according to the function:

Swap: MTable[Plaintext(i)] and MTable[PN Seq(i)].

14. The apparatus according to claim 8 wherein the first PN generator and the second PN generator are both initialized using a secret key which is commonly utilized by both the transmitter and the receiver.

15. The apparatus according to claim 8 wherein the transmitter and receiver are implemented using at least one general purpose computer.

16. A data dependent encryption system comprising:
means for generating a first Pseudorandom Number (PN) sequence; and
encoding means for receiving and storing in a Mapping Table (MTable) plaintext data and the PN sequence and for encrypting the plaintext data to produce ciphertext by encoding the data according to the function:

Ciphertext(i)=MTable[Plaintext(i)].

17. The data dependent encryption system of claim 16 in which, following the encoding of the plaintext data, the MTable is reordered according to the function:

Swap: MTable[Plaintext(i)] and MTable[PN Seq(i)].

18. The data dependent encryption system of claim 17, further comprising:
decoding means for receiving the ciphertext and the PN sequence and for reversing the encoding of the ciphertext.

19. The data dependent encryption system of claim 18, further comprising:
means for generating a second PN sequence.

20. The data dependent encryption system of claim 18 in which the ciphertext data is imported by an Inverse Mapping Table (IMTable) within the decoding means and the ciphertext is decoded according to the function:

Plaintext(i)=IMTable[Ciphertext(i)].

21. The data dependent encryption system of claim 18 in which, following the decoding of the ciphertext, the IMTable and MTable is reordered according to the function:

Swap: IMTable[Ciphertext(i)] and IMTable[MTable[PN Seq(i)]]; and

Swap: MTable[Plaintext(i)] and MTable[PN Seq(i)].

22. A computer implemented method for encoding a sequence of plaintext data, the method comprising the steps:
(i) generating a first Pseudorandom Number (PN) sequence;
(ii) initializing a Mapping Table (MTable) using the first PN sequence;
(iii) receiving plaintext data into the MTable;
(iv) encrypting plaintext data to produce ciphertext according to the function:

Ciphertext(i)=MTable[Plaintext(i)];

(v) reordering the MTable in accordance with the function:

Swap: MTable[Plaintext(i)] and MTable[PN Seq(i)];

(vi) exporting the encrypted communication; and
(vii) repeating steps (iii) through (vi) until the sequence of plaintext data has been encrypted.

23. The method for encoding data according to claim 22 further including a method for decoding the encrypted communication comprising the steps:
(i) generating a second PN sequence;
(ii) initializing a Mapping Table (MTable) using the second PN sequence and construct and Inverse Mapping Table (IMTable) from the MTable;
(iii) receiving the encrypted communication into the IMTable;
(iv) decrypting the received encrypted communication to produce plaintext in accordance with the function:

Plaintext(i)=IMTable[Ciphertext(i)];

(v) reordering the MTable and IMTable in accordance with the functions:

Swap: IMTable[Ciphertext(i)] and IMTable[MTable[PN Seq(i)]], and

Swap: MTable[Plaintext(i)] and MTable[PN Seq(i)]; and (vi) repeating steps (iii) through (v) for all available encrypted communication.

24. The method according to claim 23 wherein the first PN sequence and second PN sequence are identical.

25. The method according to claim 22 wherein the first PN sequence is generated by combining a Pseudorandom Number (PN) generator and a secret key.

26. The method according to claim 23 wherein the second PN sequence is generated by combining a Pseudorandom Number (PN) generator and a secret key.

* * * * *